United States Patent [19]

Sekimoto

[11] Patent Number: 4,737,861
[45] Date of Patent: Apr. 12, 1988

[54] SYSTEM FOR RECORDING COMPONENT SIGNALS AND REPRODUCING A COMPOSITE VIDEO SIGNAL AND COMPONENT SIGNALS INCLUDING ADDING COLOR BURST TO THE LUMINANCE COMPONENT

[75] Inventor: Kunio Sekimoto, Katano, Japan

[73] Assignee: Matsushita Electric Industrial Co., Ltd., Osaka, Japan

[21] Appl. No.: 760,980

[22] Filed: Jul. 31, 1985

[30] Foreign Application Priority Data

Aug. 2, 1984 [JP] Japan ................................ 59-163155

[51] Int. Cl.[4] .............................................. H04N 9/81
[52] U.S. Cl. .................................... 358/319; 358/320; 358/326; 360/37.1
[58] Field of Search ............... 358/326, 310, 319, 320, 358/324, 325, 334, 17, 19; 360/36.1, 37.1

[56] References Cited

U.S. PATENT DOCUMENTS

| 4,119,999 | 10/1978 | Gallo ..................................... 358/319 |
| 4,200,881 | 4/1980 | Carnt et al. .......................... 358/326 |
| 4,212,027 | 7/1980 | Lemoine ........................... 358/326 X |
| 4,249,198 | 2/1981 | Ito et al. ........................... 358/326 X |
| 4,415,935 | 11/1983 | Suzuki .............................. 358/326 X |
| 4,460,926 | 7/1984 | Nakamuta ....................... 358/326 X |

Primary Examiner—Raymond F. Cardillo
Assistant Examiner—Wayne R. Young
Attorney, Agent, or Firm—Wenderoth, Lind & Ponack

[57] ABSTRACT

A system for recording and reproducing three component signals configuring the video signal is equipped with a first synchronizing signal generator used to generate a burst signal to be added to a luminance signal and a color component signal during recording and reproduction and the read clock used for the memory to correct the time base of the reproduced component signal and a second synchronizing signal generator used to generate the synchronizing signal to be added to the composite video signal.

7 Claims, 5 Drawing Sheets

SYSTEM FOR RECORDING COMPONENT SIGNALS AND REPRODUCING A COMPOSITE VIDEO SIGNAL AND COMPONENT SIGNALS INCLUDING ADDING COLOR BURST TO THE LUMINANCE COMPONENT

BACKGROUND OF THE INVENTION

The present invention can be used for recording and reproducing systems such as VTRs for broadcasting service and business use and is particularly effective to carry out good time base correction.

VTRs used for the broadcasting service today employ tapes of 1″ and 2″ widths, which are the mainstream, while the video signal recording systems employ the system which directly modulates the frequency of the composite video signal.

During such recording and reproducing processes, a time base variation is caused by uneven head rotation, uneven tape running and the like. Such a variation is corrected during reproduction by the time base corrector (TBC) by means of the horizontal synchronous signal or burst signal in the reproduced video signal. With this system, however, the color signal in the case of the NTSC system is modulated using the quadrature phase by a 3.58 MHz subcarrier and added to the luminance signal. For this reason, the color signal, when frequency modulated, is far from the FM carrier, thereby causing insufficient reduction of the noise which is the feature of FM, while the color subcarrier varies the phase by as much as the residual jitter of the TBC and this phase variation generates the phase noise causing insufficient convergence of the color vector.

In view of these points noted above and to improve the amplitude of the color signal and S/N in the phase direction and to further enhance the convergence of the color vector, a system is available as a recording system wherein even the two components of the color signal are recorded using frequency modulation, time base corrected during reproduction, modulated (encoded) by the reference subcarrier and added to the luminance signal to thereby produce the composite video signal. By this system, because the color signal (in this case, the color signal is one of the component signals) is recorded using frequency modulation by the base band, the color signal is reproduced with a good S/N. Furthermore, because the color signal is encoded by the reference subcarrier, the phase signal is not generated and a color signal of good reproduction can be obtained.

An example of this system is shown in FIG. 1 for explanation.

In FIG. 1, the terminals 1, 2, and the 3 are luminance signal (Y), R-Y signal, and the input terminal of the B-Y signal respectively; element 25 is a synchronizing signal generator; element 5 is a time base compressor; element 4 and 6 are frequency modulators; elements 7 and 8 are heads; elements 9 and 10 are frequency demodulators; elements 11 and 12 are TBCs; elements 14 is a reference signal input terminal; elements 15 is a synchronizing generator; element 16 is an encoder; and elements 1, 19, 20 and 21 are Y, R-Y, B-Y signals and an output terminal of the composite image signal. The Y signal applied to the terminal 1 is modulated by the frequency modulator 4 and recorded on the tape by the head 7. On the other hand, the R-Y signal (See FIG. 2(a)) and B-Y signal (See FIG. 2(b)) which are the components of the two color signals applied to the terminals 2 and 3, and the R-Y signal is added by means of the adder 26 to the synchronizing signal generated by the synchronizing signal generator 25 from the horizontal synchronizing signal, time base compressed to $\frac{1}{2}$ of 1 line by the time base compressor 5, turned into one signal ($\overline{R-Y}$ represents the R-Y signal compressed into $\frac{1}{2}$ line) in such orders $\overline{R-Y}.\overline{B-Y}.\overline{R-Y}.\overline{B-Y}$ . . . (See FIG. 2(c)), modulated by the frequency modulator 6, and recorded on the tape by the head 8.

The luminance signal and color signal form separate tracks by means of the head 7 and head 8, and are recorded on the tape. During the reproduction, the Y signal reproduced by the head 7 is demodulated by the frequency demodulator 9 and time base corrected by the TBC 11. The color signal reproduced by the head 8 is demodulated by the frequency demodulator 10, time base corrected by the TBC 12, and expanded to the original time base. The TBCs 11 and 12 write signals into the memory by the write clock generated from the horizontal synchronizing signal in the reproduced and demodulated signal and read out the signal from the memory through the read clocks 22 and 23 generated by the synchronizing generator 15 from the reference signal applied to the terminal 14, thereby performing the time base correction and expanding operation. At this stage, the synchronizing signal is rejected and the reference synchronizing signal 24 generated from the synchronizing generator 15 is added to the Y signal by the adder 13. In this manner, signals are replaced with the synchronizing signal without noise so that the reproduced signals Y, R-Y and B-Y are obtained on the terminals 18, 19 and 20. On the other hand, the signals R-Y and B-Y, the output of the TBC 12, are encoded by the encoder 16 through the reference subcarrier 27 generated by the synchronizing generator 15, added with the Y signal by the adder 17, and the reproduced composite video signal is obtained on the terminal 21.

By this system, however, because the TBC generates the write clock only by the horizontal synchronizing signal in the reproduced signal, it is difficult to follow the jitter of the signal completely. Because the synchronizing signal is added anew by the adder 26 when the R-Y signal of the output of the terminal 19 is applied to be recorded next on the VTR during dubbing, the coupled errors during the dubbing, if repeated, accumulate causing the time base correction characteristic to be degraded during the dubbing, which is a problem.

SUMMARY OF THE INVENTION

A primary object of the present invention is to satisfactorily remove the time base variation occurring during reproduction of the video signal.

Another object of the present invention is to provide a recording and producing system wherein the coupled errors of the component signal and burst signal or the synchronizing signal do not occur even if the ambient temperature varies. In the system of the present invention, the burst signal to be added to the component signal during reproduction and the read out clocks to be used for the memory to correct the time base of the reproduced component signal are generated by the same means to generate the synchronizing signal to achieve the object noted above. This means to generate the synchronizing signal is separately composed from the means to generate the synchronizing signal which generates the synchronizing signal to be added to the composite video signal.

BRIEF DESCRIPTION OF THE DRAWINGS

FIG. 3(a) is a block diagram showing the recording system and FIG. 3(b) is a block diagram showing the reproducing system.

DETAILED DESCRIPTION OF THE PREFERRED EMBODIMENTS

Figure 3A:
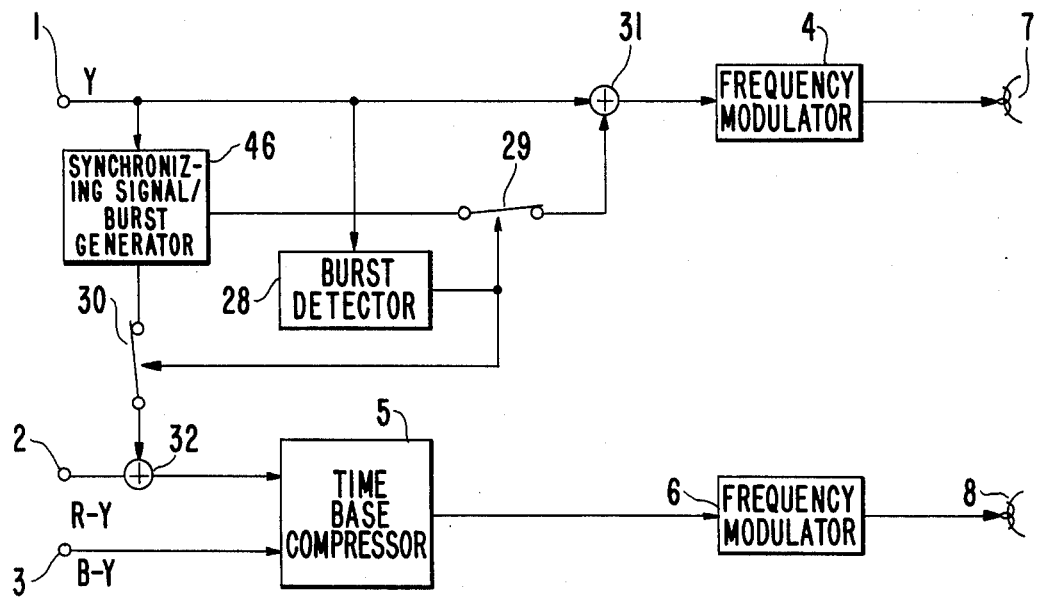
FIGS. 3(a)-(b) illustrate an embodiment of the recording and reproducing system of the present invention.
Figure 3B:
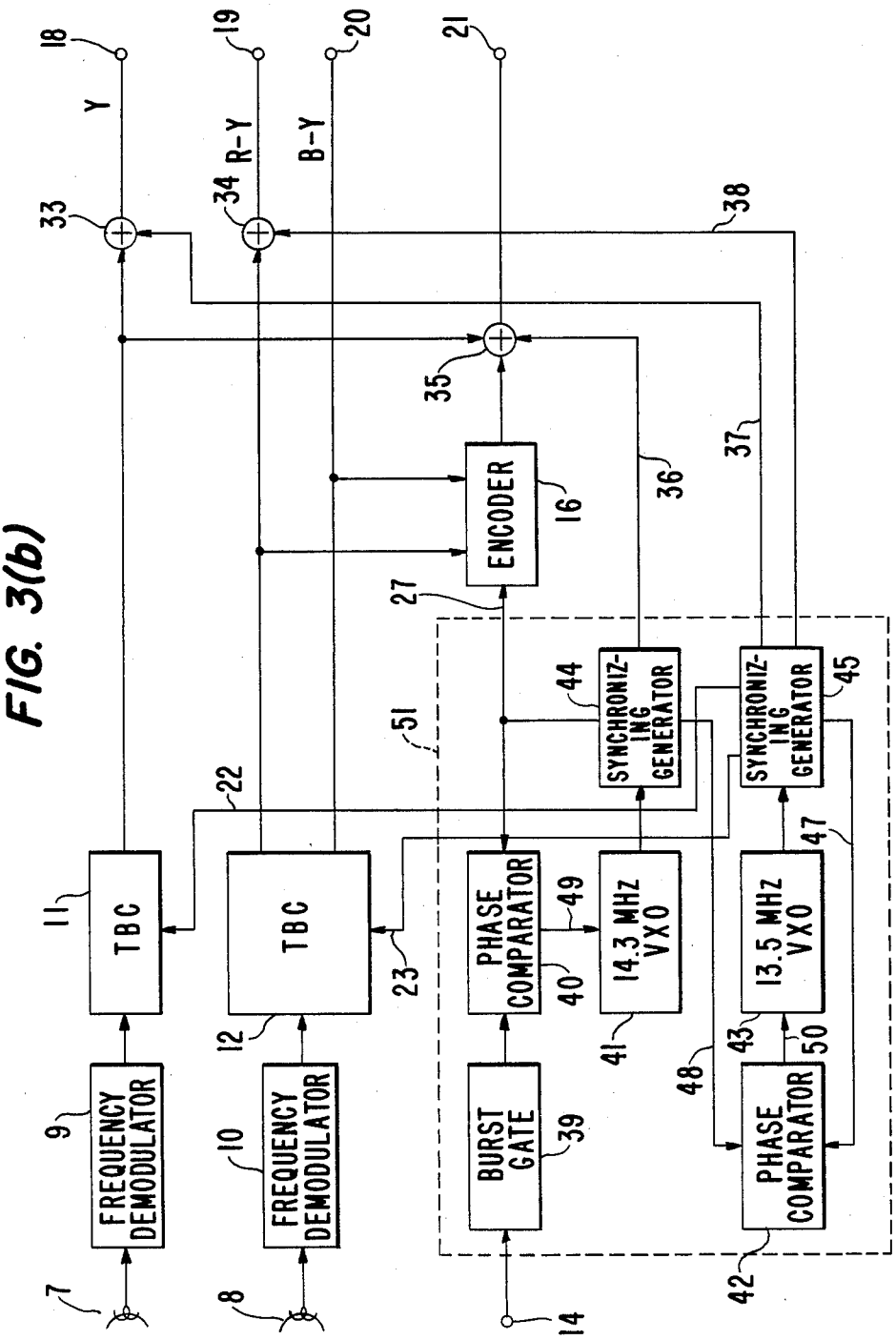

An embodiment of the recording system of the playback system of the present invention is shown in FIG. 3(a) and that of the reproduction system is shown in FIG. 3(b).

Figure 1:
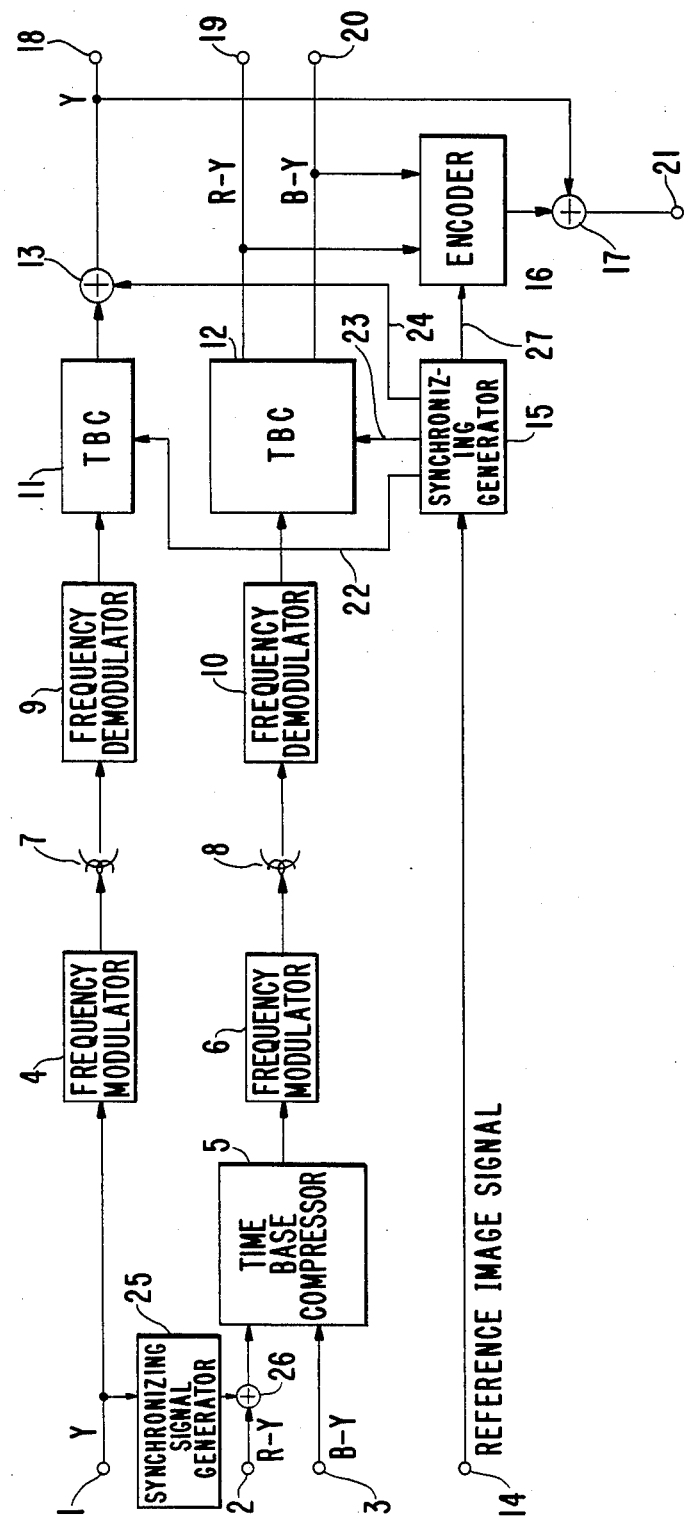
FIG. 1 is a block diagram illustrating a conventional video signal recording and reproducing system.

In the figures, the components which perform the same operation illustrated in FIG. 1 are assigned the same numbers.

Figure 4:
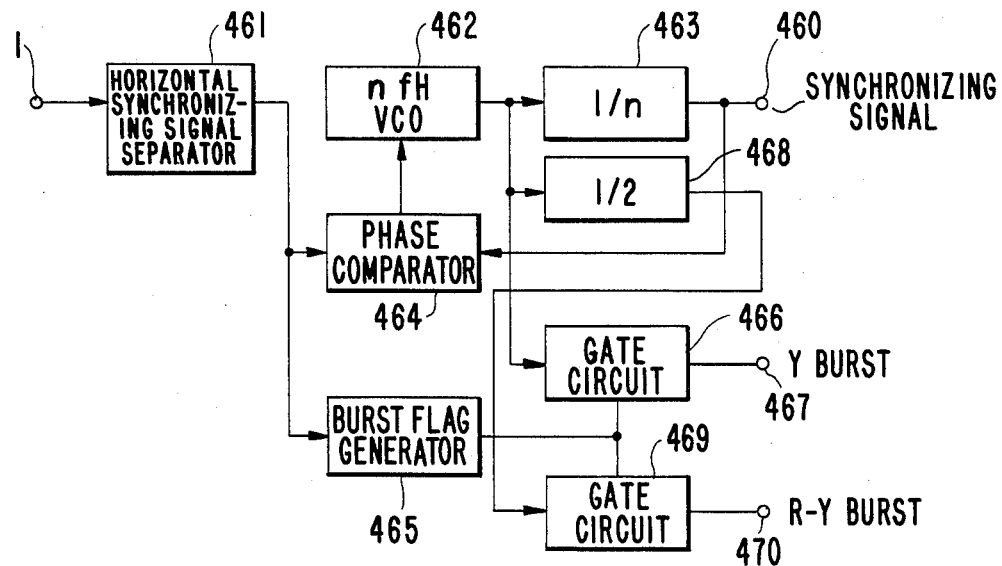
FIG. 4 is a block diagram showing the details of the generator 46 of the synchronizing signal and burst signal in the recording and reproducing system of FIG. 3.

In FIG. 3(a), element 28 is the burst detector to detect the burst signal in the Y signal added by the terminal 1 and elements 29 and 30 are the switches controlled by the output of this burst detector 28. Elements 31 and 32 are adders. Element 46 is the synchronizing signal/burst signal generator to generate from the horizontal synchronizing signal in the Y signal the horizontal synchronizing signal to be added to the color signal and the burst signal to be added to the Y signal and color signal. FIG. 4 shows the details of an embodiment of this synchronizing signal/burst signal generator 46. In FIG. 4, element 461 is a horizontal synchronizing signal separator to separate the horizontal synchronizing signal from the Y signal added to the terminal 1. Element 462 is a variable oscillator and element 463 is a divider to divide into n the output of this variable generator 462. The phase comparator 464 compares the phases of the horizontal synchronizing signal separated from said Y signal and the output signal of the variable oscillator 462 divided into n, and controls the variable oscillator 462 by the output thus obtained. As a result of this, the signal of a frequency $nf_H$ (n: integer, $f_H$: horizontal frequency) is an output of the variable oscillator 462. The burst flag generator 465 generates the burst flag signal from the horizontal synchronizing signal separated from said Y signal.

The output of the variable oscillator 462 is gated by said burst flag signal through the gate circuit 466 to thereby obtain the burst for the Y signal on the terminal 467.

Element 468 is a divider to divide by half the output of the variable oscillator 462. This signal divided into a half is gated by said burst flag signal through the gate circuit 469 to thereby obtain the burst for the R-Y signal on the terminal 470. On the terminal 460 is obtained the synchronizing signal for the R-Y signal which is an output of the n divider 463.

In FIG. 3(a), the Y signal applied to the terminal 1 is fed to the burst detector 28 to detect the presence of the burst signal. When the burst detector 28 determines that there is no burst, the switches 29 and 30 are closed, the burst signal is added to the Y signal by the adder 31, and the horizontal synchronizing signal and burst signal are added to the R-Y signal by the adder 32.

If at this time the burst signal is on the input Y signal, the horizontal synchronizing signal and burst signal are on the input R-Y signal also, and if the burst signal is not on the input Y signal, then, the horizontal synchronizing signal and the burst signal is not on the R-Y signal, too.

Figure 2:
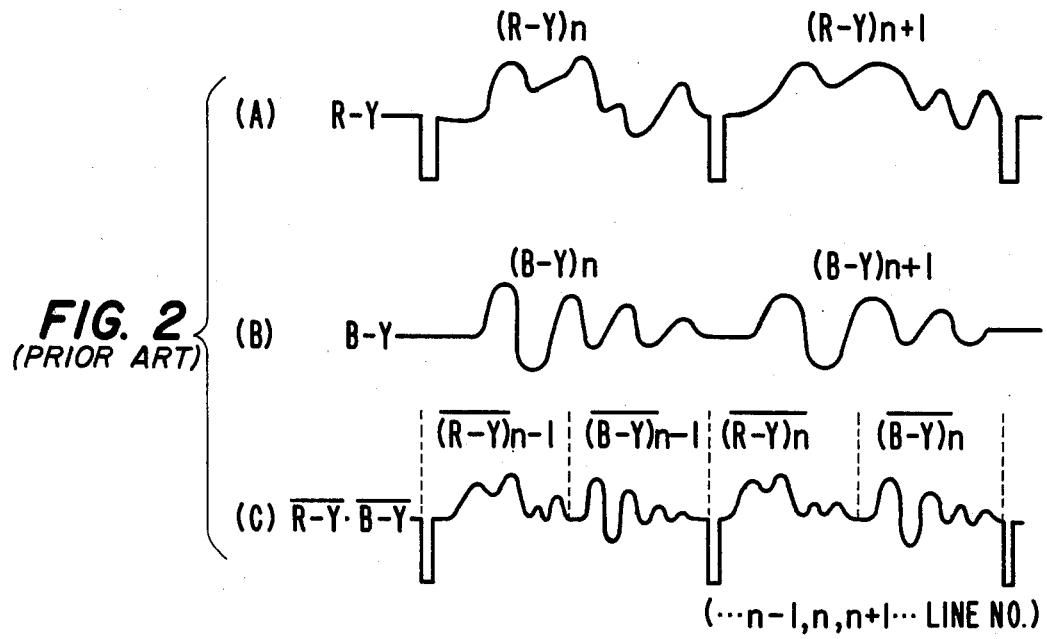
FIGS. 2(a)-(c) are waveform diagrams used to explain the operation of the time base compressor in the system of FIG. 1.

Therefore, the burst signal may be detected by the R-Y signal. The frequency of the burst signal is set to a convenient frequency (such as the reciprocal of an integral multiple of the clock frequency, for example) to generate the write clock by the TBC during reproduction. To cite an example, if the clock frequency of the TBC is set as $f_C=13.5$ MHz (in the case of an NTSC system, $f_H$:$f_H$ is the horizontal frequency), the burst signal of the Y signal is set as $f_{BY}=2.25$ MHz ($=143$ $f_H=f_C/6$) and the burst signal of the R-Y signal is set as $f_{BC}=1.125$ MHz ($=f_{BY}/2=143$ $f_H/2f_C/12$). The Y signal added to the burst signal in such manner is modulated by the frequency modulator 4 and recorded on the tape by the head 7. On the other hand, the R-Y signal added to the horizontal synchronizing signal and burst signal and the B-Y signal applied to the terminal 3 are compressed by the time base compressor 5 in the same manner as the case of FIG. 1, as shown in FIG. 2(c), to be made into one signal, modulated by the frequency modulator 6, and recorded on the tape by the head 8.

In FIG. 3(b), 51 is a synchronizing generator consisting of circuits 39~45. This synchronizing generator 51 will be subsequently described in detail.

The signal reproduced by the head 7 during reproduction is demodulated by the frequency demodulator 9 and time base corrected by the TBC 11. The time base corrected Y signal is added to the synchronizing signal and the burst signal 37 generated in the synchronizing generator by the adder 33, and produced at the output terminal 18.

Said Y signal time base corrected is added, by the adder 35, to the color signal encoded by the encoder 16 and the synchronizing signal 36 generated by the synchronizing generator 51 and output on the terminal 21 as the composite video signal. On the other hand, the signal reproduced by the head 8 is demodulated by the frequency demodulator 10, time base corrected and time base expanded by the TBC 12, and expanded on the original time base. Of the two color signals which are expanded, the R-Y signal is added, by the adder 34, to the horizontal synchronizing signal and the burst signal 38 generated by the synchronizing generator 45, and output on the output terminal 19.

Furthermore, the B-Y signal is produced on the terminal 20. The R-Y and B-Y signals of the output of the TBC 12 are encoded by the subcarrier 27 generated in the synchronizing generator 51 by the encoder 16.

The write clock to be added to the TBCs 11 and 12 in (b) of FIG. 3 generates the continuous signal by the AFC loop from the horizontal synchronizing signal added to the Y signal or R-Y signal and further the write clock is generated by setting the phase through the burst signal added to the Y signal and R-Y signal. Therefore, it is possible to generate the clock which follows correctly after the time base variation of the reproduced video signal as compared with the case of FIG. 1 to thereby permit a good time base correction at the TBCs 11 and 12.

Figure 5:
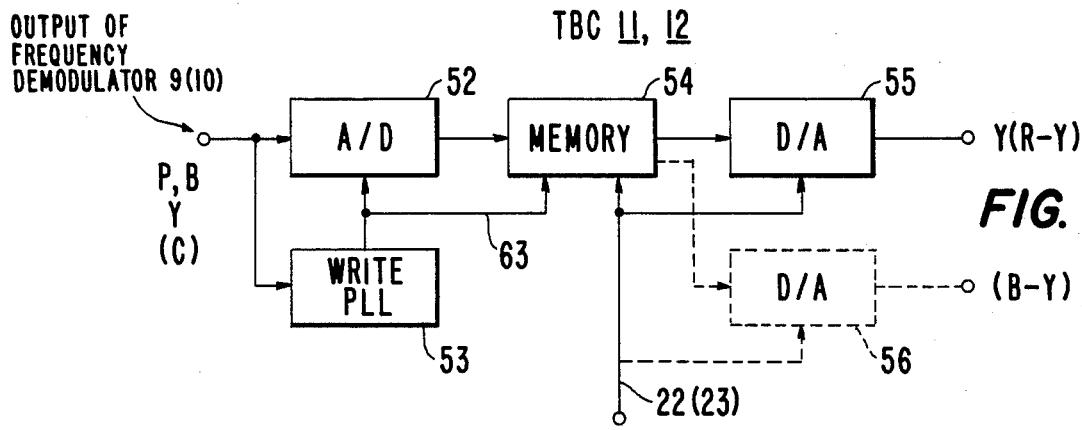
FIG. 5 is a block diagram showing the details of the TBCs 11 and 12 of FIG. 3.
Figure 6:
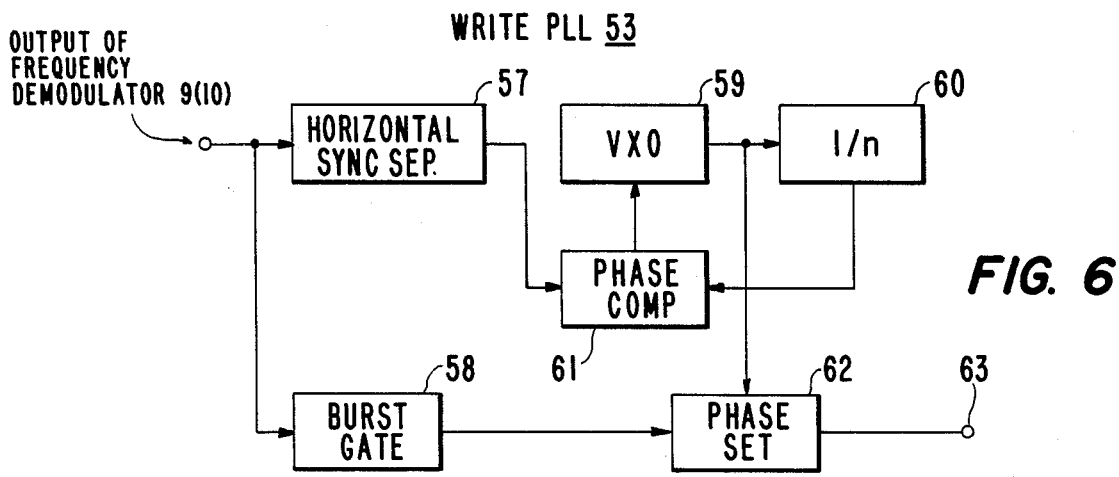
FIG. 6 is a block diagram showing the details of the WRITE PLL in FIG. 5.

Now, the details of the TBCs 11 and 12 will be described with respect to FIGS. 5 and 6.

TBC 11 (12) consists of an A/D converter 52, WRITE PLL 53, memory 54 and D/A converter 55 (56). D/A converter 56 is used only by the ATBC 12. TBC write clock 63 (13.5 MHz) is generated by WRITE PLL 53 from the output Y(C) signal of the frequency demodulator 9 (10). The write clock is synchronized with the output signals of the frequency demodulator 9 (10).

The output signal of the frequency demodulator 9 (10) is converted into a digital signal by the write clock 63 through the A/D converter 52 and stored in the memory 54. The signal entered into the memory 54 is read out by the reference read clock 22 (23) generated by the synchronizing generator 51, has its time base variation removed, and is returned into an analog signal by D/A converter 55 (56). During such an operation, the C signal is entered to 13.5 MHz, read out as R-Y and B-Y at 6.75 MHz and expanded by two times.

WRITE PLL 53 consists of the horizontal synchronizing signal separator 57, burst gate 58, VXO 59, divider 60, phase comparator 61 and phase setter 62. From the output Y(C) signal of the frequency demodulator 9 (10), the horizontal synchronizing signal is separated by the horizontal synchronizing signal separator 57. The signal which divides the output of this horizontal synchronizing signal and variable oscillator (VXO) 59 by n using the divider 60, is introduced to the phase comparator 61 for phase comparison. VXO 59 is controlled by the output error signal of the phase comparator 61 and the continuous signal of the frequency $nf_H$ ($f_H$: horizontal synchronizing frequency) is obtained at such an output. If n is set as 858, then, $nf_H$ is 13.5 MHz.

On the other hand, the burst signal is separated from the output of the frequency demodulator 9 (10) by the burst gate 58 and introduced by the phase setter 62. The output signal of VXO 59 is introduced into the other input of the phase setter 62 and the phase of this signal is set to the phase of the burst signal. As noted above, by setting the write clock phase by the burst signal of 2.25 MHz, the clock which is more accurate than the configuration of using only the AFC by the horizontal synchronizing signal of 15.73 KHz can be obtained.

A method is also effective wherein the oscillation frequency of VXO 59 is multiplied by an integral multiple of 13.5 MHz (for example by 4), the phase which is most close to the burst of the four phases is selected after dividing the VXO output, for example, dividing by four, by the phase setter 62 during the phase setting, and further such phase is matched to the burst phase.

Now, the synchronizing generator 51 will hereafter be described. The burst signal is separated by the reference image signal applied to the terminal 14 through the burst gate 39 and fed to the phase comparator 40. On the other hand, the output signal of the variable oscillator 41 configured by a stable element such as the crystal resonator (the oscillation frequency in the case, for example, of the NTSC system is 14.3 MHz [=910 $f_H$=$4f_{SC}$: $f_{SC}$ is the subcarrier frequency of 3.58 MHz.]) is fed to the synchronizing generator 44 to generate the subcarrier 27, composite synchronizing signal 36, horizontal synchronizing signal 48, burst flag signal, blanking signal and the like. The output color subcarrier 27 of the synchronizing generator 44 is fed to the phase comparator 40 for phase comparison with the burst signal which is the output of the burst gate 39, so that the variable oscillator 41 is controlled by the error signal 49. Thus, the continuous signal synchronized with the reference video signal is obtained at the output of the oscillator 41. The burst signal in the reference video signal was used to configure this loop, but the loop configuration may be made by using the horizontal synchronizing signal.

In case the reference video signal is not applied to the terminal 14, the oscillator 41 oscillates by free-running to be divided and decoded by the synchronizing generator 44, and various signals used as the reference are generated.

The horizontal synchronizing signal 47 generated from the output signal (for example, the frequency of 13.5 MHz [=858 $f_H$: NTSC system]) of the variable oscillator 43 consisting of the stable element such as the crystal resonator and by the synchronizing generator 45 and the horizontal synchronizing signal 48 which is the output of the synchronizing generator 44, are fed to the phase comparator 42 for phase comparison. The error signal 50 of such a phase comparison controls the variable oscillator 43 and the continuous signal which synchronizes with the output signal of the synchronizing generator 44, i.e., the continuous signal synchronized with the reference video signal from the terminal 14 can be obtained as an output.

This signal is fed to the synchronizing generator 45 to be divided and decoded to thereby generate the read clock 22 (for example, the frequency of 13.5 MHz [=858 $f_H$=$f_C$]) of the TBC 11, the read clock 23 (for example, the frequency of 6.75 MHz [=429 $f_H$=$f_C/2$]) of the TBC 12, horizontal synchronizing signal 47, synchronizing signal and burst signal 37 to be added to the Y output signal, horizontal synchronizing signal and burst signal 38 to be added to the R-Y output signal, blanking signal for TBC, control signal and the like.

The color signal can be expanded twice fold by writing with the $f_C$ clock and by reading with the $f_C/2$ clock in the TBC 12.

Of the signals generated by the two loops, the color signal is encoded (16) (burst signal is also added) by the color subcarrier generated by the first-loop (synchronizing generator 44), the synchronizing signal 36 and Y signal that are generated by the same synchronizing generator 44 are added (35), and the composite image signal is obtained on the terminal 21. The synchronizing signal and burst signals 37 and 38 generated by the second loop (synchronizing generator 45) are added to the Y signal and R-Y signal by the adders 33 and 34, and output on the terminals 18 and 19.

As noted above, by configuring the two loops, it is possible to independently select an optimum value of the frequency of the oscillator used to generate the subcarrier for encoding and the oscillator used to generate the burst signal to be added to the TBC clock or component signal. It is also possible to independently adjust the positions of the synchronizing signal and burst signal of the encoder output and the positions of those of the component output. By generating the synchronizing signal and burst signal for the encoder output by one loop and by generating those for the component output by the other loop, the positional relationship between the synchronizing signal and burst signal of the encoder output itself as well as the positional relationship between the synchronizing signal and burst signal of the Y and R-Y signals between the component signals will not deviate even if the relationship of the relative position between the two loops should change due to temperature changes, for example. Therefore, a deviation of the positions of the Y signal and the color signal components does not occur and a satisfactory timing can be obtained at all times.

In the embodiment of FIGS. 3(a)-(b), a method was described wherein the synchronizing signal and burst signal to be added to the component signal are generated by the second loop; however, the synchronizing signal may be generated by the first loop and only the burst signal generated by the second loop. The reason is that though stability of the positional relationship between the synchronizing signal and burst signal to be added to the component signal is poor in this case as compared with the case of FIGS. 3(a)-(b), and because the write clock of the TBCs 11 and 12 are set finally by the burst signal added to the Y signal and R-Y signal, at least the burst signal can be regarded as have been generated by the second loop so as to maintain a stable positional relationship between the burst signal and the output Y signal and R-Y signal. Because the synchronizing signal is used for generating the continuous signal by AFC when making the write clock and for separating the burst signal, the object of the TBC according to the present invention can be achieved even if the synchronizing signal is not in a perfect and consistent positional relationship with the burst signal. Details of the synchronizing generators 44 and 45 in the synchronizing generator 51 will be described.

The synchronizing generator 45 consists of a 6-divider 64, 2-divider 65, gate circuits 66 and 67, 429-divider 68, 2-divider 69, burst flag generator 70, 525-divider 71, and decoder 72. The output signal of VXO 43 is divided by the 429-divider 68 and the signal of a frequency $f_H$ is obtained. This signal of $2f_H$ is further divided by the 2-divider 69 and the signal of a frequency $f_H$ (horizontal frequency) is obtained. From this signal, the burst flag used to gate the burst signal section by the burst flag generator 70 is generated.

The $2f_H$ is divided by the 525-divider 71 and the frequency $f_V$ (vertical frequency) is obtained. A composite synchronizing signal is obtained by decoding these $2f_H$, $f_H$ and $f_V$ signals by the decoder 72. This composite synchronizing signal is used as the synchronizing signal of the R-Y signal. The output signal of VXO 43 is divided by the 6-divider 64, and further divided by the 2-divider 65 and gated by said burst flag through the gate circuits 66 and 67. At the output of the gate circuit 66, the burst (at a frequency of 2.25 MHz) for the Y signal is obtained and the burst (at a frequency of 1.125 MHz) for the R-Y signal is obtained at the output of the gate circuit 67.

Figure 7:
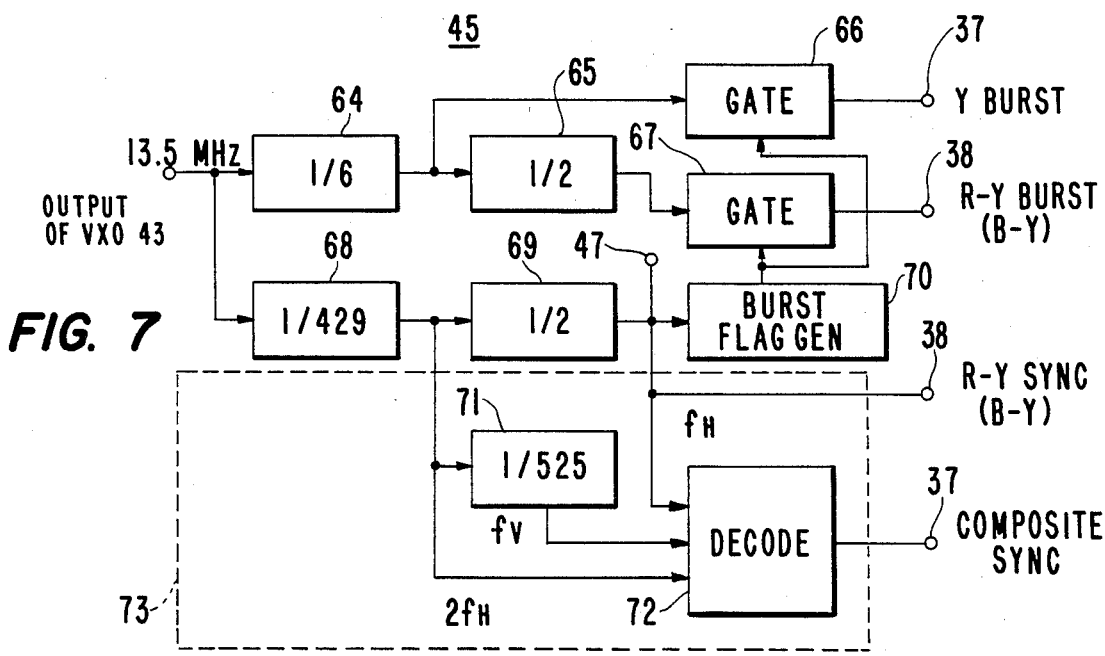
FIG. 7 is a block diagram showing the details of the synchronizing generators 44 and 45 in FIG. 3.

When changing the synchronizing signal to be added to the component output signal into the synchronizing generator 44, the portion shown by the broken lines 73 of the synchronizing generator 45 becomes unnecessary and the simple structure can be used. The synchronizing signal generating section of the synchronizing generator 44 is the same as the divider 68 shown in FIG. 7 which is a 455-divider.

Figure 8:
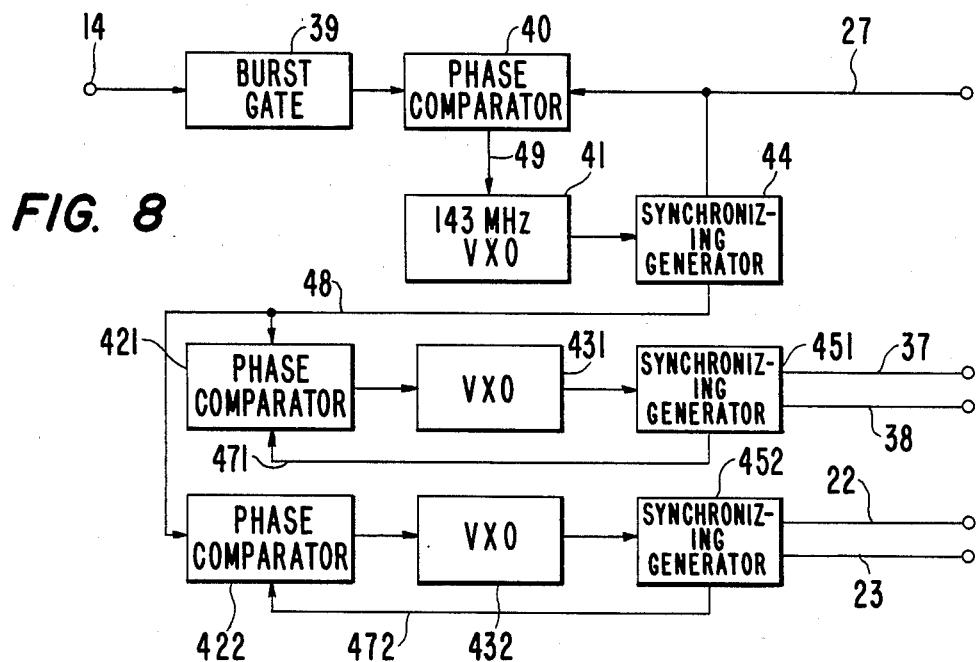
FIG. 8 is a block diagram showing another embodiment of the synchronizing generator 51 in the system of FIG. 3.

In FIG. 8, a block diagram of another embodiment of the synchronizing generator 51 is shown for explanation. In FIG. 8, element with the same numbers as shown in FIG. 3(b) denote the same elements which perform the same operation.

Elements 421, 422, 431, 432, 451 and 452 are the same as 42, 43 and 45 shown in FIG. 3(b) and their operations are the same. The first loop consists of the burst gate 39, phase comparator 40, variable oscillator 41 and synchronizing generator 44 is quite the same as that of FIG. 3(b).

By means of the second loop consisting of the phase comparator 421, variable oscillator 431 and the synchronizing generator 451 and in the same manner as FIG. 3(b), the synchronizing signal and burst signal 37 to be added to the output Y signal of the component and the horizontal synchronizing signal and burst signal 38 to be added to the output R-Y signal are generated. Read clocks 22 and 23 of the TBCs 11 and 12 are generated by the third loop consisting of the phase comparator 422, variable oscillator 432 and synchronizing generator 452.

As noted above, by separating the loop to generate the synchronizing signal and burst signal to be added to the component output from the loop to generate the TBC read clock, the phase of the TBC read clock can be changed independently of the second loop so that the position of the output signal can be adjusted. Because the signals 37 and 38 are made by one loop in this case also, the relationship of the relative position will not deviate and the satisfactory timing can be obtained all of the time.

In the first and second embodiments noted above, the synchronizing signal and burst signal is configured to be added to the R-Y signal only, but the time base variation of the B-Y signal can be accurately removed by adding the synchronizing signal and burst signal or the burst signal to the B-Y signal.

In the second embodiment noted above, the second and third loops are controlled by the output horizontal synchronizing signal of the first loop but various other modifications are possible such as the method to control all loops by the reference image signal or the method to control the second loop by the reference image signal and to control the first loop by the output horizontal synchronizing signal of the second loop.

Furthermore, in the first and second embodiments noted above, a method was explained wherein the two component signals of the color signal is time base compressed and made into one signal and recording it by frequency modulation. However, the present invention is also effective for a method to record the two component signals of the color signal by separately modulating the frequency and by multiplexing the frequency and for a method to record the two component signals of the color signal by frequency modulation through the line sequential system.

Not only limited to the method wherein the Y signal and color signal are formed into separate tracks by the separate heads for recording, as described above, the present invention is also effective for a method of recording using one head (or a pair of heads) by adding to the color signal which is frequency modulated at the low pass area of the Y signal which is frequency modulated.

According to the present invention, it is possible to record and reproduce the color signal satisfactorily not only in the direction of the amplitude but also S/N in the phase direction, satisfactory time base correction can be made not only for the self-recording but also for dubbing, stable time base correction can be made with respect to the temperature changes and the like, and the timing can be matched to the Y signal and the color signal.

The synchronizing signal and burst signal generated by the reference synchronizing generator 51 are added to the output of the Y signal and R-Y signal and these signals are recorded as they are during dubbing. Therefore, there is no accumulated coupling error during recording as shown in FIG. 1 when again generating these signals from the horizontal synchronizing signal in the Y signal and the time base correction can be performed satisfactorily even during dubbing.

What is claimed is:

1. A recording and reproducing system for recording and reproducing three component signals of a video signal comprising:
   a recording means for recording on a recording medium said three component signals, including a luminance signal to which is added a burst signal, and of two color signals to at least one of which is added a horizontal synchronizing signal and a burst signal;
   a reproducing means for reproducing three component signals from said recording medium;
   a correcting means for correcting a time base of the three component signals which have been reproduced, said correcting means having a memory for storing said three component signals which have been reproduced;
   a first synchronizing signal generation means for generating a color subcarrier and composite synchronizing signal;
   an output means for outputting a composite video signal by combining an output of said first synchronizing signal generating means and said three time base corrected component signals;
   a second synchronizing signal generation means for generating a burst signal and a read clock for said memory;
   an adding means for adding said burst signal generated by said second synchronizing signal generating means to a luminance signal and at least one color signal of said three time base corrected component signals.

2. A recording and reproducing system for recording and reproducing three component signals consisting of a luminance signal and two color component signals comprising:
   a generating means for generating a horizontal synchronizing signal and a burst signal from a horizontal synchronizing signal included in at least one of said component signals;
   an adding means for adding said burst signal generated by said generating means to said luminance signal, and for adding said horizontal synchronizing signal and burst signal generated by said generating means to at least one of two color component signals;
   a recording means for recording on a recording medium said three component signals;
   a reproducing means for reproducing three component signals from said recording medium;
   a correcting means for correcting a time base of said three component signals which have been reproduced, said correcting means having a memory for storing said three component signals which have been reproduced;
   a first synchronizing signal generating means for generating, using a reference signal as an input, a color subcarrier and composite synchronizing signal which is synchronized with said reference signal;
   an output means for outputting a composite video signal by combining an output of said first synchronizing signal generating means and said three time base corrected component signals;
   a second synchronizing signal generation means for generating, using an output of said first synchronizing signal generating means which has said reference signal as an input thereto, a burst signal and a horizontal synchronizing signal and a read clock for said memory synchronized with said reference signal, and
   another adding means for adding said burst signal generated by said second synchronizing signal generating means to said time base corrected luminance signal, and for adding said horizontal synchronizing signal and said burst signal generated by said second synchronizing signal generating means to at least one of said two time base corrected color component signals.

3. A recording and reproducing system in accordance with claim 2, further comprising a means for generating a write clock for said memory based on a horizontal synchronizing signal and a burst signal contained within one of said three reproduced component signals.

4. A recording and reproducing system for recording and reproducing three component signals consisting of a luminance signal and two color component signals comprising:
   a generating means for generating a horizontal synchronizing signal and a burst signal from a horizontal synchronizing signal included in at least one of said component signals;
   an adding means for adding said burst signal generated by said generating means to said luminance signal, and for adding said horizontal synchronizing signal and burst signal generated by said generating means to at least one of two color component signals;
   a multiplexing means for multiplexing two of said component color signals;
   a recording means for recording on a recording medium said luminance signal and said two multiplexed component signals;
   a reproducing means for reproducing three component signals from said recording medium;
   a correcting means for correcting a time base of said three component signals which have been reproduced, said correcting means having a memory for storing said three component signals which have been reproduced;
   a first synchronizing signal generation means for generating, using a reference signal as an input, a color subcarrier and a composite synchronizing signal which is synchronized with said reference signal;
   an output means for outputting a composite video signal by combining an output of said first synchronizing signal generating means and said three time base corrected component signals;
   a second synchronization signal generation means for generating, using an output of said first synchronizing signal generating means which has said reference signal as an input thereto, a burst signal and a horizontal synchronizing signal and a read clock for said memory synchronized with said reference signal, and another adding means for adding said burst signal generated by said second synchronizing signal generating means to said time base corrected luminance signal, and for adding said horizontal synchronizing signal and said burst signal generated by said second synchronizing signal generating means to at least one of said two time base corrected color component signals.

5. A recording and reproducing system in accordance with claim 4, wherein said multiplexing means multiplexes said two component signals by time base compression, and wherein said separating means expands a time base of said two component color signals which have been time base compressed, thereby producing two component color signals whose time base has been expanded to that of said two color signals prior to processing by said system.

6. A recording and reproducing system for recording and reproducing three component signals consisting of a luminance signal and two color component signals comprising:

a generating means for generating a horizontal synchronizing signal and a burst signal from a horizontal synchronizing signal included in at least one of said component signals;

an adding means for adding said burst signal generated by said generating means to said luminance signal, and for adding said horizontal synchronizing signal and burst signal generated by said generating means to at least one of two color component signals;

a burst detecting means for detecting a burst signal included in at least one of said component signals;

an inhibiting means for inhibiting an addition of an output signal from said generating means to said luminance signal and at least one of said two color component signals when a burst signal is detected by said burst detecting means;

a recording means for recording on a recording medium said three component signals including said burst signal contained within at least one of said component signals;

a reproducing means for reproducing three component signals from said recording medium;

a correcting means for correcting a time base of said three component signals which have been reproduced, said correcting means having a memory for storing said three component signals which have been reproduced;

a first synchronizing signal generation means for generating, using said reference signal as an input, a color subcarrier and composite synchronizing signal which is synchronized with said reference signals;

an output means for outputting a composite video signal by combining an output of said first synchronizing signal generating means and said three time base corrected component signals;

a second synchronizing signal generation means for generating, using an output of said first synchronizing signal generating means which has said reference signal as an input thereto, a burst signal and a horizontal synchronizing signal and a read clock for said memory synchronized with said reference signal, and another adding means for adding said burst signal generated by said second synchronizing signal generating means to said time base corrected luminance signal, and for adding said horizontal synchronizing signal and said burst signal generated by said second synchronizing signal generating means to at least one of said two time base corrected color component signals.

7. A recording and reproducing system for recording and reproducing three component signals consisting of a luminance signal and two color component signals comprising;

a generating means for generating a horizontal synchronizing signal and a burst signal from a horizontal synchronizing signal included in at least one of said component signals;

an adding means for adding said burst signal generated by said generating means to said luminance signal, and for adding said horizontal synchronizing signal and burst signal generated by said generating means to at least one of two color component signals;

a burst detecting means for detecting said burst signal included in at least one of said component signals;

an inhibiting means for inhibiting an addition of an output signal from said generating means to said luminance signal and to at least one of said two color component signals when a burst signal is detected by said burst detecting means;

a means for multiplexing said two component color signals into a multiplexed color signal using time base compression;

a recording means for recording on a recording medium said luminance signal and said two multiplexed component signals;

a reproducing means for reproducing three component signals from said recording medium;

a correcting means for correcting a time base of said three component signals which have been reproduced, said correcting means having a memory for storing said three component signals which have been reproduced;

a demultiplexing means for producing two component color signals using time base expansion;

a first synchronizing signal generation means for generating, using a reference signal as an input, a color subcarrier and composite synchronizing signal which is synchronized with said reference signal;

an output means for outputting a composite video signal by combining an output of said first synchronizing signal generating means and said three time base corrected component signals;

a second synchronization signal generation means for generating, using an output of said first synchronizing signal generating means which has said reference signal as an input thereto, a burst signal and a horizontal synchronizing signal and a read clock for said memory synchronized with said reference signal, and another adding means for adding said burst signal generated by said second synchronizing signal generating means to said time base corrected luminance signal, and for adding said horizontal synchronizing signal and said burst signal generated by said second synchronizing signal generating means to at least one of said two time base corrected color component signals.

* * * * *